United States Patent
Goh

(10) Patent No.: US 6,671,353 B1
(45) Date of Patent: Dec. 30, 2003

(54) METHOD FOR RECORDING AND REPRODUCING A SHORT VOICE MEMO IN PORTABLE TELEPHONE

(75) Inventor: Dae-Gun Goh, Pusankwangyok-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/337,376

(22) Filed: Jun. 21, 1999

(51) Int. Cl.[7] .......................... H04M 1/64; H04M 3/00; H04M 11/10

(52) U.S. Cl. .......................... 379/67.1; 379/80; 379/85; 379/88.04; 379/88.23; 379/88.27; 379/265.01; 379/265.06; 455/412; 455/413

(58) Field of Search .......................... 379/67.1, 68, 71, 379/80, 85, 88.04, 88.23, 91.01, 93.09, 93.12, 114.11, 114.12, 114.13, 114.14, 114.15, 127.05, 189, 192, 265.01, 265.06, 265.07, 266.07, 88.26, 88.27; 455/412, 413, 550, 551, 557, 466

(56) References Cited

U.S. PATENT DOCUMENTS

| 3,842,213 A | * | 10/1974 | Foresta et al. | 379/80 |
|---|---|---|---|---|
| 4,481,382 A | * | 11/1984 | Villa-Real | 455/556 |
| 4,860,339 A | * | 8/1989 | D'Agosto, III et al. | 379/67 |
| 5,394,445 A | * | 2/1995 | Ball et al. | 379/67.1 |
| 5,400,393 A | * | 3/1995 | Knuth et al. | 379/88 |
| 5,526,407 A | * | 6/1996 | Russell et al. | 379/88 |
| 5,535,261 A | * | 7/1996 | Brown et al. | 379/67 |
| 5,652,789 A | * | 7/1997 | Miner et al. | 379/201 |
| 5,754,629 A | * | 5/1998 | Kunimori et al. | 379/88 |
| 5,867,793 A | | 2/1999 | Davis | 455/556 |
| 5,926,524 A | * | 7/1999 | Taylor | 379/88.08 |
| 6,262,719 B1 | * | 7/2001 | Bi et al. | 345/179 |

FOREIGN PATENT DOCUMENTS

| EP | 0 762 711 A2 | 3/1997 | H04M/1/72 |
|---|---|---|---|
| GB | 2 289 192 A | 11/1995 | H04M/1/56 |
| JP | 9-27840 | 1/1997 | H04M/1/02 |
| JP | 9-98228 | 4/1997 | H04M/11/10 |
| WO | WO 98/54878 | 12/1998 | H04M/1/00 |
| WO | WO 99/11048 | 3/1999 | H04M/1/60 |
| WO | WO 99/26393 | 5/1999 | H04M/1/65 |

* cited by examiner

*Primary Examiner*—Allan Hoosain
(74) *Attorney, Agent, or Firm*—Dilworth & Barrese, LLP

(57) ABSTRACT

A portable telephone records a short voice memo during a call and reproduces the recorded short voice memo later. Upon detection of a voice record key input during a call, the portable telephone converts an input voice signal to voice data, stores the voice data, and determines whether a stop key is input. Upon detection of the stop key input, the telephone stops storing the voice data and displays an index number input request message. Upon detection of an index number input in response to the index number input request message, the telephone records the stored voice data in a voice memo table in association with the input index number, and determines whether a voice reproduce key is input. Upon detection of the voice reproduce key input, the telephone displays an index number input request message and determines whether the voice memo table has a voice memo corresponding to an input index number. When the voice memo table has a voice memo corresponding to the input index number, the telephone reproduces the voice memo using a speaker.

16 Claims, 3 Drawing Sheets

METHOD FOR RECORDING AND REPRODUCING A SHORT VOICE MEMO IN PORTABLE TELEPHONE

BACKGROUND OF THE INVENTION

1. Field of the Invention

The present invention relates generally to a method for recording and reproducing voices in a portable terminal such as a portable telephone, and in particular, to a method for recording a short voice memo during a call and then, reproducing the recorded voice memo later.

2. Description of the Related Art

A portable telephone is used for exchanging voice signals and may provide the user with additional services, such as an absent subscriber message service where a short voice message is recorded announcing that the user cannot answer the call at the moment. However, such a message is typically recorded when the phone is not in use, and message recordings are generally not permissible when the phone is being used.

In a portable telephone, when the user has received important information from the other party during a call, there are no means of recording the information except if there is paper and pen available. The inconvenience of always carrying pen and paper with the portable telephone creates the demand for a portable telephone having a voice memo function. The voice memo function can be implemented using the existing function of converting an analog voice signal to digital data to transmit it to the other party and recording the digital voice data. The recorded digital data can be converted back to an analog voice signal and reproduced on the speaker at a later time.

SUMMARY OF THE INVENTION

It is, therefore, an object of the present invention to provide a method for recording a short voice memo during a call on a portable telephone.

It is another object of the present invention to provide a method for reproducing a short voice memo recorded in a portable telephone.

In accordance with the method of the present invention, a voice record key is input during a call, the portable telephone converts the input voice signal to voice data and stores the voice data until a stop key is input. Upon detection of the stop key input, the telephone stops storing the voice data and displays an index number input request message. When the index number has been entered by the user, the telephone records the stored voice data by the index number in a voice memo table In accordance with the reproducing method, the user enters the voice reproduce key , and, in response, the telephone displays a request for the corresponding index number. The user inputs the desired memo index number, and the telephone then determines whether the voice memo table has a voice memo corresponding to the input index number. If the voice memo table has a voice memo corresponding to the index number entered, the telephone reproduces the voice memo using a speaker.

BRIEF DESCRIPTION OF THE DRAWINGS

These and other objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described hereinbelow with reference to the accompanying drawings. In the following description, well known functions or constructions are not described in detail since they would obscure the invention in unnecessary detail.

Figure 1:
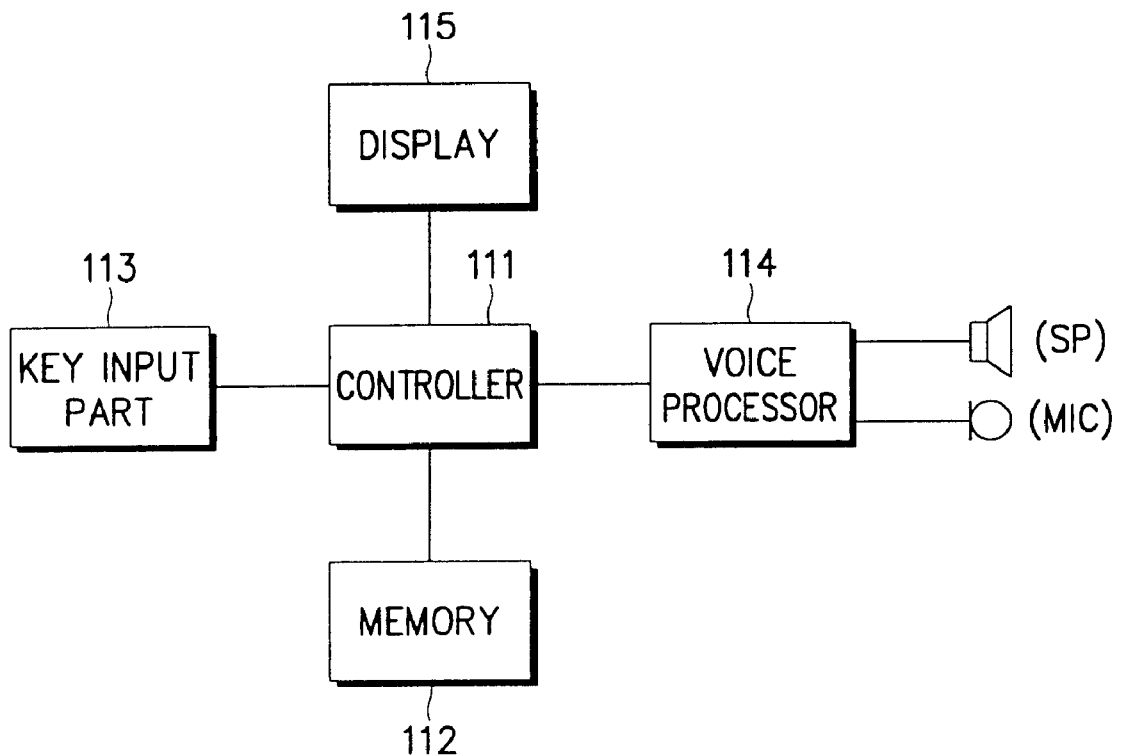
FIG. 1 is a block diagram illustrating the structure of a portable telephone according to the present invention.

FIG. 1 is a block diagram of a portable telephone, which illustrates only the elements necessary for the implementation of the present invention. The controller 111 controls the overall operation of the portable telephone, and in particular, controls a display 115, a voice processor 114 and a memory 112 according to key data input from a key input part 113. The memory 112 permanently stores a program for controlling the overall operation of the portable telephone and temporarily stores data generated during execution of the program. The key input part 113 includes numeric keys and function keys, and provides the controller 111 with key data generated according to key manipulation by the user. The voice processor 114 is preferably composed of a PCM (Pulse Code Modulation) codec and a compression/expansion device, which converts (or modulates) an analog voice signal input from a microphone MIC to digital data, and converts (or demodulates) digital data provided from the controller 111 to an analog voice signal which is provided to a speaker SP. The display 115, preferably an LCD (Liquid Crystal Display), displays various display data under the control of the controller 111.

Figure 2:
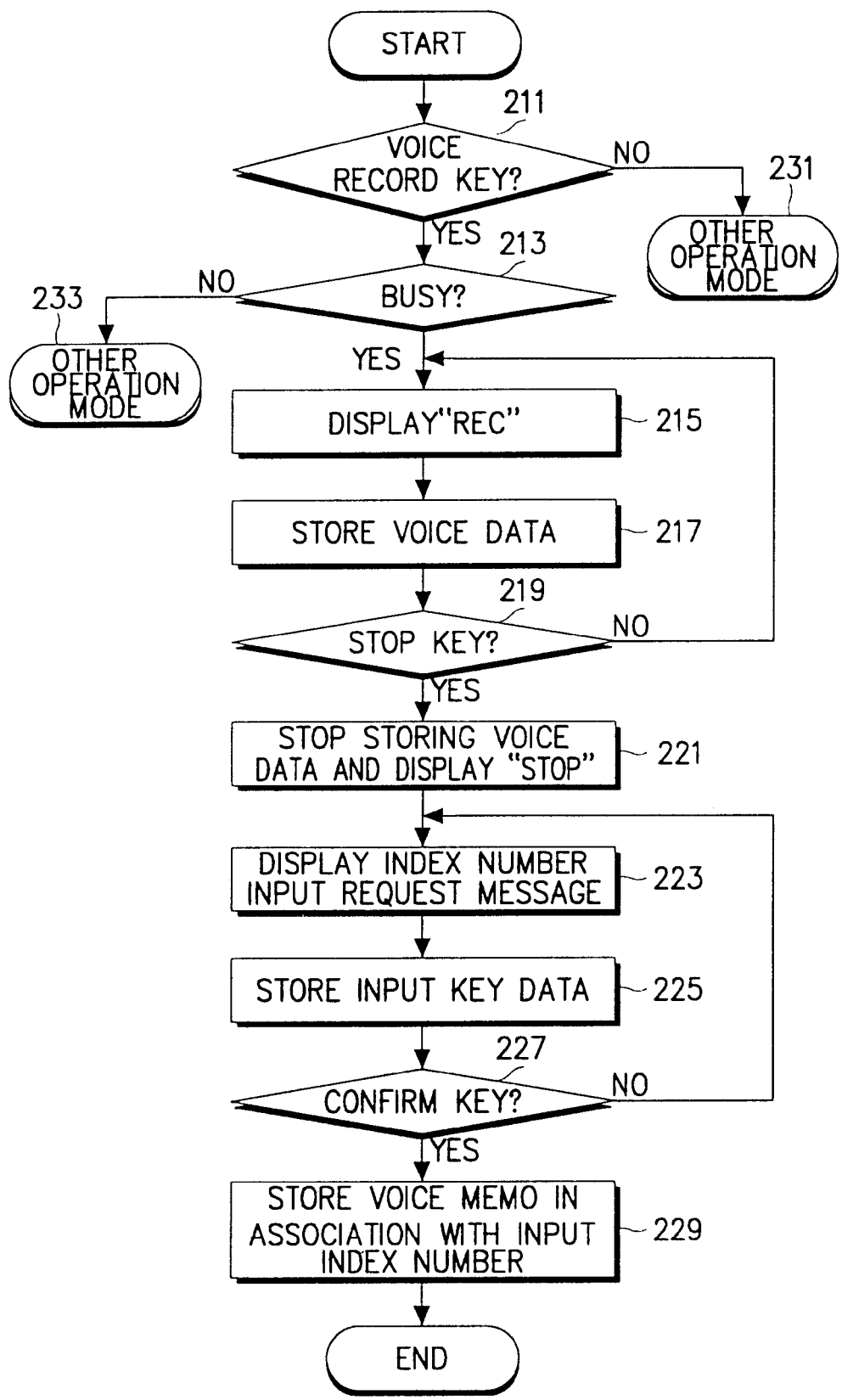
FIG. 2 is a flow chart showing the method for recording a short voice memo in a portable telephone according to an embodiment of the present invention.

FIG. 2 shows the method for recording a short voice memo during a call according to an embodiment of the present invention.

FIG. 2 has the controller 111 monitoring in step 211 whether the voice record key is input (or depressed). When the voice record key is input, the controller 111 proceeds to step 213. Otherwise, if the voice record key is not input, the controller 111 proceeds to step 231 to enter the operation indicated by whatever key was inputted. The voice record key is implemented by an existing key on the portable telephone, and in the exemplary embodiment, it is implemented by the clear key.

When the voice record key is input, the controller 111 examines in step 213 whether the portable telephone is busy. If the portable telephone is busy, the controller 111 proceeds to step 215. If the portable telephone is not busy, the controller 111 proceeds to step 233 to enter another operation mode.

If the portable telephone is busy, the controller 111 displays a recording sign "REC" on a display 115 in step 215. The user can then dictate a message for recording which, in step 217, the controller 111 converts the voice signal input from the microphone MIC to voice data and temporarily stores the voice data in a buffer.

While storing the voice data, the controller 111 checks in step 219 whether the stop key is input. When the stop key is input, the controller 111 proceeds to step 221. Until the stop key is input, the controller 111 returns to step 215 to continuously record the voice data. In the exemplary embodiment, the stop key is implemented by pressing the clear key again. Upon detection of the stop key input, the controller 111 stops recording the voice data and displays a "STOP" message on the display 115, in step 221.

In step 223, the controller 111 displays on the display 115 a message requesting that an index number be assigned to the recorded voice memo, and stores the key data for the index number input in step 225.

Then, in step 227, the controller 111 checks whether the confirm key has been input. If it has, the controller 111 proceeds to step 229. If not, the controller 111 returns to step 223 to continuously display the message requesting the index number. In the exemplary embodiment, the confirm key is also implemented by the clear key.

When the confirm key is pressed, the controller 111 stores the previously recorded voice memo in the voice memo table of the memory 112 in association with the input index number in step 229, thereby completing the procedure for recording the short voice memo during a call according to the present invention.

Table 1 shows a voice memo table in which several files for the short voice memos recorded during a call are stored, by way of example.

TABLE 1

| Index | Voice Memo |
| --- | --- |
| 1 | Michael's Phone Number is 777-7777 |
| 2 | Account Number is 93-28374-83374 |
| 3 | ... |
| . | ... |
| . | |
| . | |

Figure 3:
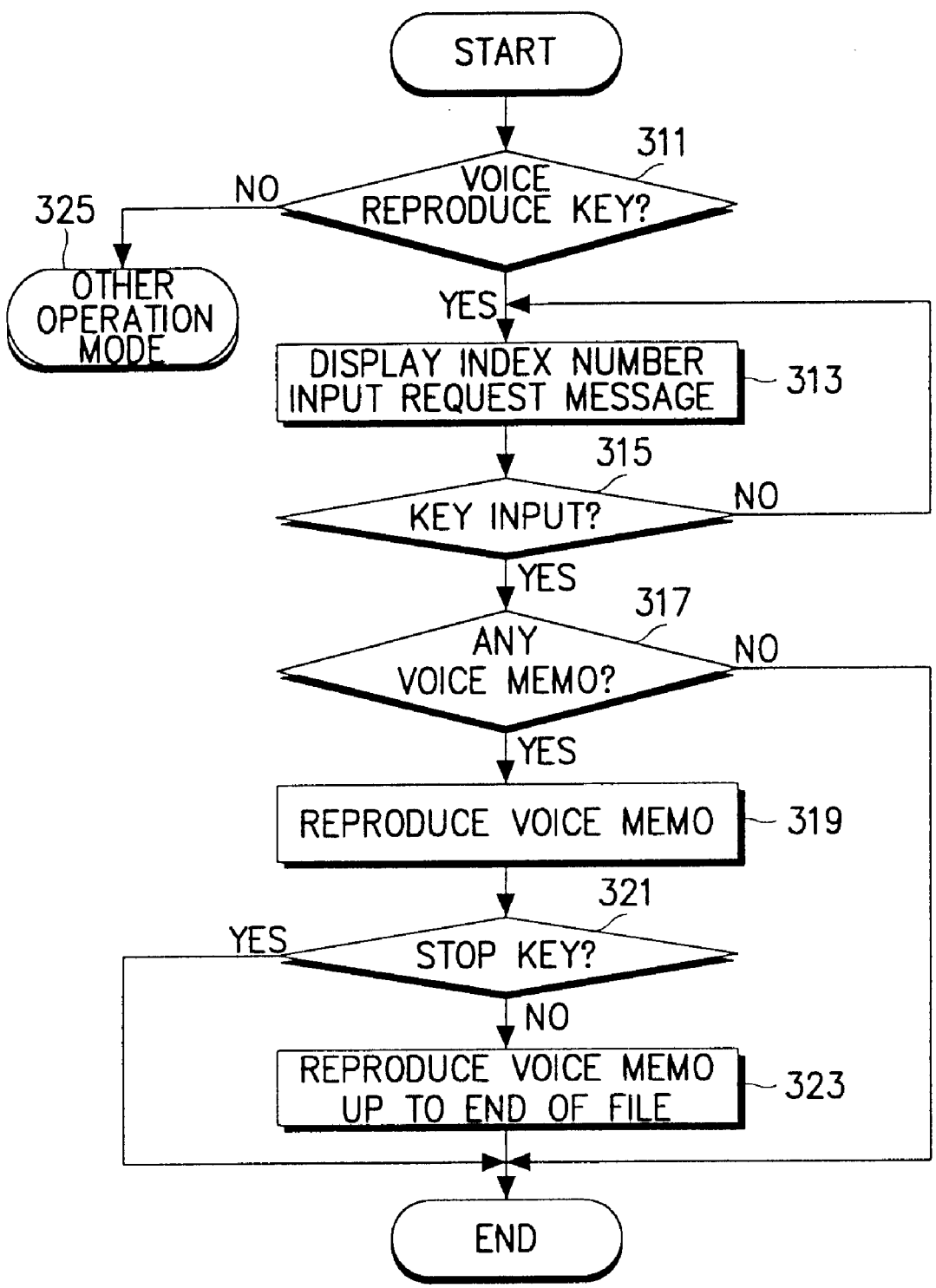
FIG. 3 is a flow chart showing the method for reproducing a short voice memo recorded in a portable telephone according to an embodiment of the present invention.

FIG. 3 shows the method for reproducing the short voice memo recorded as in Table 1.

Referring to FIG. 3, the controller 111 monitors in step 311 whether a voice reproduce key is input. If the voice reproduce key is pressed, the controller 111 proceeds to step 313. If not, the controller 111 proceeds to step 325 to enter a normal operation mode. The voice reproduce key is an existing key on the portable telephone.

When the voice reproduce key is pressed, the controller 111 commands the display 115 to display a message requesting the index number for a particular voice memo the user wants to hear in step 313. The controller 111 checks in step 315 whether an index number has been entered by at least one key input. If it has, the controller 111 proceeds to step 317; if not, the controller 111 returns to step 313 to continuously display the index number input request message.

In step 317, after at least one key input occurs, the controller 111 checks whether there is a voice memo associated with the index number the user has entered. If there is a voice memo associated with the index number, the controller 111 proceeds to step 319; otherwise, the controller 111 ends the procedure.

At step 319, the controller 111 reproduces the voice memo using the speaker SP, and checks in step 321 whether the stop key has been pressed. If the stop key has been pressed, the controller 111 ends the procedure; otherwise, the controller 111 finishes reproducing the voice memo up to an end of the file (EOF) in step 323, thereby completing the short voice memo reproducing process according to the present invention.

It should be noted the voice memo may also be transmitted via the telephone to another party.

As can be appreciated from the foregoing descriptions, a user can easily and efficiently record a short voice memo in the portable telephone during a call.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for recording and reproducing a short voice memo for a portable telephone, comprising the steps of:
   upon detecting a voice record key input during a call between at least two parties, checking to see if the portable telephone is in use, converting an input voice signal to digital voice data, pre-storing the digital voice data, and determining whether a stop key is input;
   upon detecting the stop key input, stopping pre-storing the digital voice data and displaying an index number input request message;
   upon detecting an index number input by one of the said at least two parties in response to the index number input request message, recording the pre-stored voice data in a voice memo table in association with the input index number;
   determining whether a voice reproduce key is input;
   upon detection of the voice reproduce key input, displaying an index number input request message and determining whether the voice memo table has a voice memo corresponding to an input index number; and
   reproducing the voice memo using a speaker, when the voice memo table has a voice memo corresponding to the input index number.

2. The method for recording and reproducing a short voice memo according to claim 1, wherein said voice memo is reproduced in a telephone transmission to another party.

3. The method for recording and reproducing a short voice memo according to claim 1, wherein said portable telephone implements said voice record key by depressing an existing key.

4. The method for recording and reproducing a short voice memo according to claim 3, wherein said portable telephone implements said stop key by depressing the existing key a second time.

5. The method for recording and reproducing a short voice memo in claim 1, wherein said portable telephone implements said voice reproduce key by depressing an existing key.

6. The method for recording and reproducing a short voice memo according to claim 1, wherein said step of reducing the voice memo includes converting digital data into analog data.

7. A method for recording a short voice memo in a portable telephone, comprising the steps of:
   designating a record key to initiate recording and a stop key to cease recording;
   responding to an input of said record key by checking if a call between at least two parties is in progress;
   if a call is in progress, indicating a record mode to enable a user to pre-store voice data;
   monitoring for an input of said stop key;
   if said stop key is inputted, indicating a stop mode to the user;
   requesting the user to input an index number to identify the stored voice data;
   if said index number is inputted, displaying the index number and requesting confirmation; and
   upon confirmation, recording the voice data as a voice memo by the index number.

8. The method for recording a short voice memo according to claim 7, further comprising the step of reproducing said voice memo.

9. The method for recording a short voice memo according to claim 8, wherein said reproducing step comprises the steps of:

designating a reproduce key and a stop key;

responding to an input of said reproduce key by requesting the user for the index number of the voice memo to be reproduced;

once the index number is inputted, checking if a voice memo with said index number exists;

if the voice memo exists with said index number, reproducing said voice memo through a speaker;

monitoring for an input of the stop key or an indication of reaching the end of the voice memo; and ending the procedure.

10. The method for recording a short voice memo according to claim 9, wherein said voice memo is reproduced in a transmission to another party.

11. The method for reproducing the voice memo according to claim 9, wherein said step of requesting for the index number is displayed on an LCD (Liquid Crystal Display).

12. The method for recording the voice memo according to claim 7, wherein said step of indicating the record mode and said step of indicating the stop mode is displayed on an LCD (Liquid Crystal Display).

13. A method for recording a short voice memo in a portable telephone, comprising the steps of:

indicating a start of a voice memo during a call between at least two parties;

pre-storing the voice memo;

indicating a stop of the voice memo;

stopping said recording;

identifying the voice memo by an index number inputted by one of the said at least two parties; and recording said voice memo under said identification.

14. The method for recording a short voice memo according to claim 13, further comprising the step of reproducing said voice memo.

15. The method for recording a short voice memo according to claim 14, wherein said reproducing step comprises the steps of:

requesting reproduction of a voice memo;

inputting the identification of said voice memo; reproducing said voice memo;

ceasing said reproducing when the voice memo ends or a user indicates to do so.

16. The method for recording a short voice memo according to claim 15, wherein said voice memo is transmitted by the portable terminal to another party.

* * * * *